(12) United States Patent
Kimura

(10) Patent No.: US 10,819,146 B2
(45) Date of Patent: Oct. 27, 2020

(54) PULSED POWER TRANSMISSION APPARATUS

(71) Applicant: YAZAKI CORPORATION, Tokyo (JP)

(72) Inventor: Osamu Kimura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 64 days.

(21) Appl. No.: 16/297,814

(22) Filed: Mar. 11, 2019

(65) Prior Publication Data

US 2019/0288552 A1 Sep. 19, 2019

(30) Foreign Application Priority Data

Mar. 13, 2018 (JP) .................................. 2018-045876

(51) Int. Cl.

| | |
|---|---|
| H02J 13/00 | (2006.01) |
| B60R 16/02 | (2006.01) |
| B60R 16/023 | (2006.01) |
| H01M 10/44 | (2006.01) |
| H02J 1/02 | (2006.01) |

(Continued)

(52) U.S. Cl.
CPC ........ *H02J 13/0003* (2013.01); *B60R 16/023* (2013.01); *B60R 16/0207* (2013.01); *G07C 9/00* (2013.01); *H01M 10/44* (2013.01); *H02J 1/02* (2013.01); *H02J 1/102* (2013.01); *H02J 13/00009* (2020.01); *H02M 1/44* (2013.01); *H02M 3/155* (2013.01); *H04B 10/524* (2013.01); *B60R 16/03* (2013.01); *H02M 1/15* (2013.01); *H02M 2001/009* (2013.01); *H02M 2001/0012* (2013.01)

(58) Field of Classification Search
CPC ........ H02J 13/003; H02J 13/009; H02J 1/102; H02J 2310/40; H02M 1/44; H02M 2001/0012
See application file for complete search history.

(56) References Cited

U.S. PATENT DOCUMENTS

| | | | |
|---|---|---|---|
| 6,178,101 B1 * | 1/2001 | Shires ................. | H02M 1/4208 323/225 |
| 2002/0001211 A1 | 1/2002 | Huggett et al. | |

FOREIGN PATENT DOCUMENTS

| | | |
|---|---|---|
| EP | 3 001 526 A1 | 3/2016 |
| WO | 2014/077191 A1 | 5/2014 |

OTHER PUBLICATIONS

The extended European Search Report for the related European Patent Application No. 19160925.4 dated Apr. 17, 2019.

* cited by examiner

*Primary Examiner* — Jeffrey M Shin

(74) *Attorney, Agent, or Firm* — Kenealy Vaidya LLP

(57) ABSTRACT

When a pulsed waveform is used to transmit power-supply power in a form of a power packet etc., a filter for reducing harmonic components is disposed on a power transmission side. A switch and a control portion for controlling ON/OFF of a function of the filter are provided to turn ON the function of the filter limitedly at each of timings t1 to t2 and t3 to t4 at which the power is transmitted. The harmonic components are reduced from the waveform of the transmission power by the function of the filter. Radiation noise generated by the wire harness is reduced in a high frequency region. The function of the filter is turned OFF at a timing at which digital information is transmitted so that a waveform of the digital information can be prevented from being deformed.

2 Claims, 9 Drawing Sheets

(51) Int. Cl.
*H02J 1/10* (2006.01)
*H04B 10/524* (2013.01)
*H02M 3/155* (2006.01)
*H02M 1/44* (2007.01)
*G07C 9/00* (2020.01)
*H02M 1/00* (2006.01)
*H02M 1/15* (2006.01)
*B60R 16/03* (2006.01)

PULSED POWER TRANSMISSION APPARATUS

CROSS REFERENCE TO RELATED APPLICATIONS

This application is based on and claims priority from Japanese patent application No. 2018-045876 filed on Mar. 13, 2018, the entire contents of which are incorporated herein by reference.

BACKGROUND OF THE INVENTION

1. Technical Field

The present invention relates to a pulsed power transmission apparatus that can be used, for example, for feeding power on a vehicle etc.

2. Background Art

Generally, an on-vehicle battery or an alternator (a power generator) serving as a main power supply, and various kinds of electrical components disposed on various places on a vehicle are connected to each other respectively via a wire harness serving as an assembly of electric wires. Accordingly, power stored by the on-vehicle battery is fed as power-supply power to the various electrical components.

On the other hand, a technique for packetizing power and distributing and transmitting the packetized power has been disclosed, for example, in Patent Document WO 2014/077191. A power router described in Patent Document WO 2014/077191 has a plurality of power storage portions, a switch portion, and an output portion. The plurality of power storage portions store power of received power packets. The switch portion allocates the received power packets to the plurality of power storage portions. The output portion creates power packets based on the power stored by the plurality of power storage portions.

SUMMARY

In car components, strict restriction on radiation noise from the components and wire harnesses is determined. Specifically, the car components are required to comply with the standard CISPR25 (tolerances and measurement methods of interference characteristics for protection of on-vehicle receivers) determined by the International Special Committee on Radio Interference (CISCR).

In addition, when a power packet transmission technique described in Patent Document WO 2014/077191 is used for a device mounted on a vehicle, pulsed power high in frequency is transmitted through the wire harness. Therefore, radiation noise from the wire harness becomes an issue. Particularly, a pulsed waveform includes a fundamental frequency and harmonic components each of which has a frequency which is an integer multiple of the fundamental frequency. Accordingly, there is a concern about the influence of such harmonic components.

For example, according to the standard CISPR25, a tolerance of the radiation noise is regulated to be smaller as the frequency is higher. Accordingly, when pulsed power with a large ratio of the harmonic components is transmitted, it is difficult to suppress the radiation noise to satisfy the standard in a high frequency region. Particularly when large power like power supply power is transmitted, there is a possibility that the radiation noise from the wire harness may increase as the power increases. Accordingly, it is difficult to reduce the radiation noise.

Generally, various filters are connected to various places of the components or the wire harness. Thus, the radiation noise of the high frequency components can be reduced. However, when the power packet transmission technique as in Patent Document WO 2014/077191 is used, it is expected that connection of a filter may cause an adverse influence on rising or falling of a transmitted pulsed power waveform. Particularly, there is a higher possibility that a waveform of digital information transmitted by a header or a footer of a power packet may be distorted so that the information cannot be transmitted accurately.

The present invention has been accomplished in consideration of the aforementioned circumstances. An object of the present invention is to provide a pulsed power transmission apparatus which can make it easy to reduce radiation noise generated by a transmission line such as a wire harness and can make it easy to control power transmission.

In order to attain the aforementioned object, the pulsed power transmission apparatus according to the present invention is characterized by the following configurations (1) to (4).

(1) A pulsed power transmission apparatus including:
a power delivery portion that delivers pulsed power-supply power to a predetermined transmission line;
a filter circuit that reduces a harmonic component of a power-supply power waveform delivered to the transmission line by the power delivery portion;
a switch circuit that changes over a function of the filter circuit between ON and OFF; and
a switch control portion that controls the switch circuit; wherein:
the switch control portion turns ON the function of the filter circuit when the pulsed power-supply power is delivered to the transmission line by the power delivery portion, and turns OFF the function of the filter circuit when the pulsed power-supply power is not delivered to the transmission line by the power delivery portion.

According to the pulsed power transmission apparatus having the aforementioned configuration (1), the function of the filter circuit is turned ON when the pulsed power-supply power is delivered to the transmission line. Accordingly, it is easy to reduce the harmonic component included in the transmitted power-supply power waveform to thereby reduce radiation noise from the transmission line. In addition, the function of the filter circuit is turned OFF when the pulsed power-supply power is not delivered to the transmission line. Accordingly, when digital information other than the transmitted power is delivered to the transmission line, a waveform of the digital information can be prevented from being distorted due to the influence of the filter. In addition, power for the digital information delivered to the transmission line is small. Accordingly, large radiation noise is not generated even when the filter is turned OFF.

(2) A pulsed power transmission apparatus according to the aforementioned configuration (1), wherein:
the power delivery portion adds digital information relevant to the power-supply power to at least one of a front and a rear of the pulsed power-supply power waveform to thereby create a power packet; and
the switch control portion makes control to turn OFF the function of the filter circuit at a timing of delivering the digital information added to the power packet.

According to the pulsed power transmission apparatus having the aforementioned configuration (2), each transmitted power packet includes the digital information. Accordingly, it is easy to manage the power packet by packet. Moreover, the filter circuit is turned OFF at the timing of delivering the digital information. Accordingly, it is possible to prevent a waveform of the digital information from being distorted.

(3) A pulsed power transmission apparatus according to the aforementioned configuration (1), wherein:

the transmission line is a wire harness mounted on a vehicle.

According to the pulsed power transmission apparatus having the aforementioned configuration (3), when the pulsed power is delivered, radiation noise radiated from the wire harness mounted on the vehicle can be reduced easily to thereby satisfy a vehicle standard.

(4) A pulsed power transmission apparatus according to the aforementioned configuration (2), wherein:

the digital information includes information indicating at least one of a kind of the power packet and a power consumption destination.

According to the pulsed power transmission apparatus having the aforementioned configuration (4), the information indicating the kind of the power packet is included in the digital information. Thus, a plurality of power packets with different kinds of voltages etc. can be handled. In addition, when the information indicating the power consumption destination is included in the digital information, it is easy to change over power distribution paths from one to another power packet by power packet.

According to the pulsed power transmission apparatus according to the present invention, the harmonic component of the transmitted pulsed power waveform can be reduced by the filter. Accordingly, radiation noise generated by the transmission line such as the wire harness can be reduced. In addition, the digital information other than the pulsed power is not affected by the filter. Accordingly, control of the power transmission can be easy due to the transmission of the digital information.

The present invention has been briefly described above. When a mode (hereinafter referred to as "embodiment") for carrying out an undermentioned invention is further read through with reference to the accompanying drawings, details of the present invention will be made clearer.

DETAILED DESCRIPTION OF EMBODIMENTS

A specific embodiment about the present invention will be described below with reference to the respective drawings.

Configuration Example of System

Figure 1:
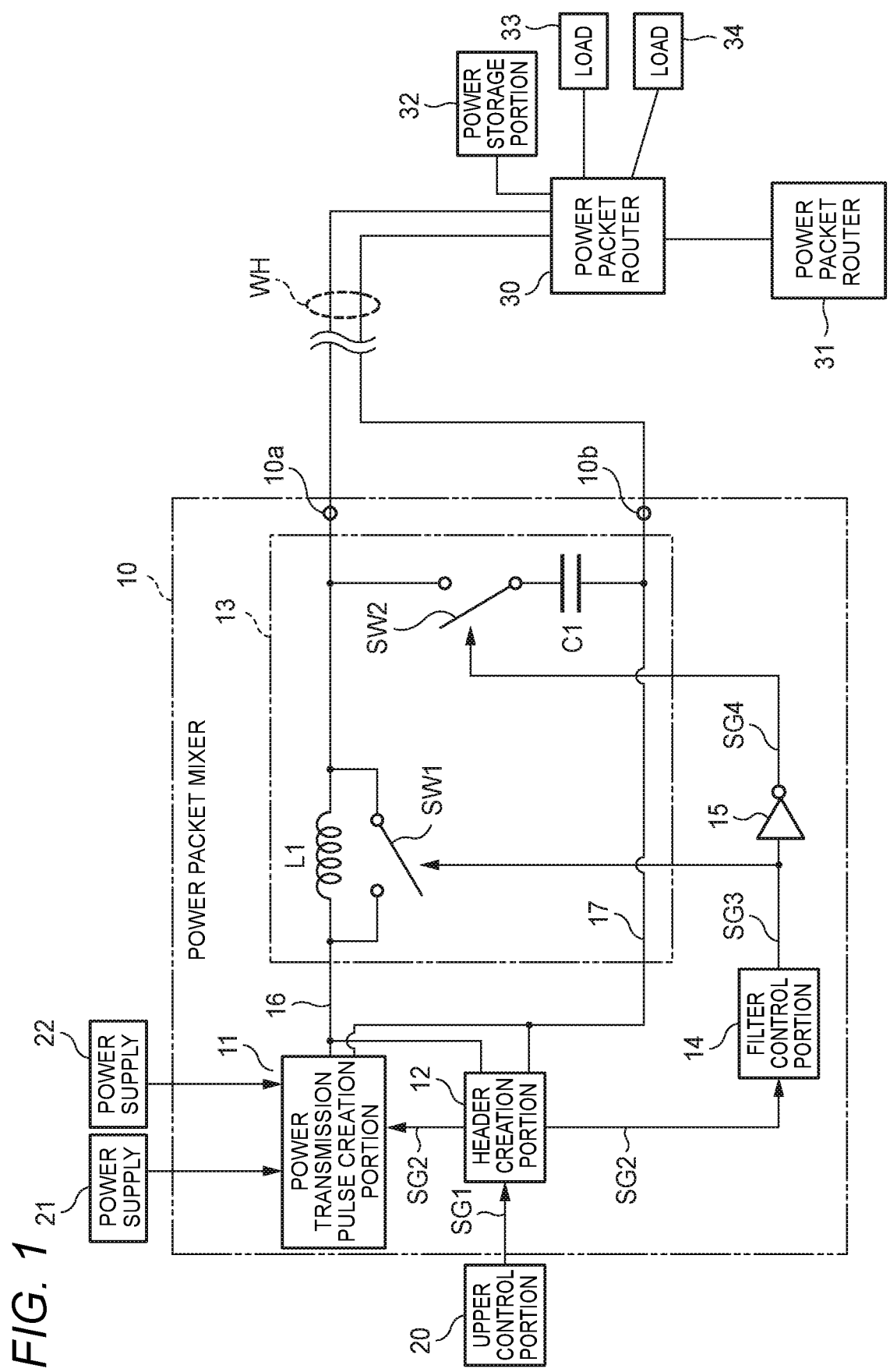
FIG. 1 is a block diagram showing a configuration example of a main portion of a pulsed power transmission system.
Figure 2:
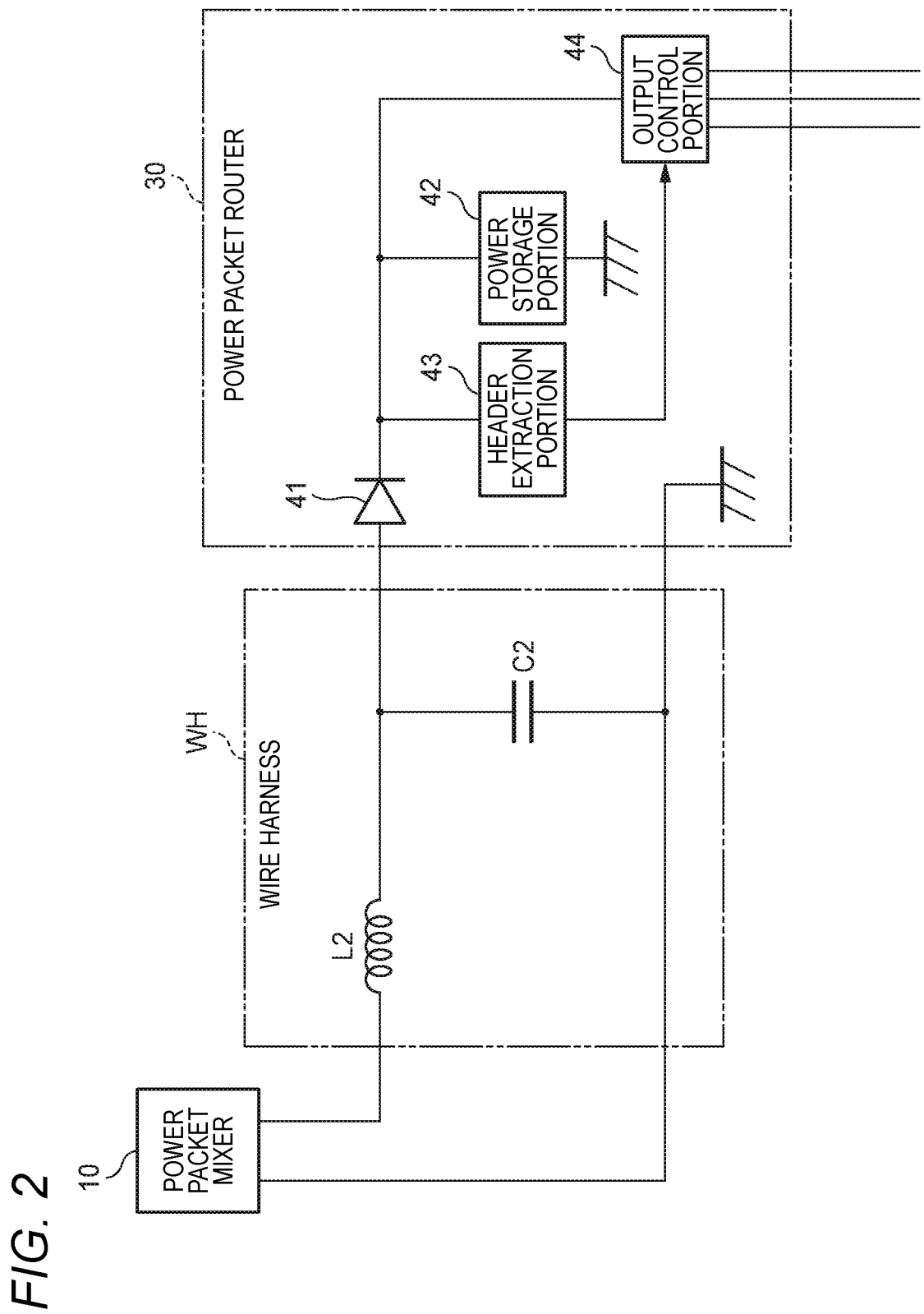
FIG. 2 is a block diagram showing a configuration example of a wire harness and a router.

FIG. 1 is a block diagram showing a configuration example of a main portion of a pulsed power transmission system in the embodiment of the present invention. FIG. 2 is a block diagram showing a configuration example of a wire harness and a router.

It is assumed that the pulsed power transmission system shown in FIG. 1 is mounted on a vehicle and used for distributing power-supply power fed from an on-vehicle battery etc. to various loads on the vehicle, i.e. on-vehicle electrical components. It is a matter of course that the pulsed power transmission system may be used for any other application than the on-vehicle system, and the configuration of details of the pulsed power transmission system may be changed suitably if necessary.

The pulsed power transmission system shown in FIG. 1 is provided with a mixer 10 creating power packets, and routers 30 and 31 distributing the power packets. The mixer 10 and the router 30 are connected to each other through a wire harness WH.

Accordingly, comparatively large power is transmitted through the wire harness WH serving as a transmission line. Therefore, it can be expected that comparatively large radiation noise occurs from the wire harness WH. In the case of the on-vehicle system, the radiation noise from the wire harness WH has to be suppressed so as to, for example, satisfy a tolerance based on the standard CISPR 25. Particularly, restriction of the tolerance is strict in a high frequency region. Accordingly, it is necessary to satisfactorily suppress high frequency radiation noise.

The wire harness WH can transmit the power packets created by the mixer 10. The pulsed power transmission system can intermittently transmit power from the mixer 10 to the routers 30 and 31, for example, using a waveform such as a rectangular wave to thereby manage the power packet by packet. Accordingly, it is easy to manage distribution of the power. However, the waveform such as the rectangular waveform includes lots of harmonic components appearing respectively at frequencies which are integer multiples of a frequency of a fundamental wave. For this reason, when the rectangular wave is transmitted without taking any special measure, there is a possibility that high frequency radiation noise exceeding the tolerance may occur due to the influence of the harmonic components in any of the transmitted power packets.

The mixer 10 shown in FIG. 1 is provided with a power transmission pulse creation portion 11, a header creation portion 12, a power transmission filter 13, a filter control portion 14, an inverter 15, a power supply line 16, and a ground line 17. The power transmission filter 13 includes a capacitor C1, a coil L1 and switch portions SW1 and SW2.

The power transmission pulse creation portion 11 selectively periodically switches DC power-supply power fed from any of power supplies 21 and 22, and creates pulsed power-supply power to be fed as each of the power packets to the power supply line 16.

Incidentally, the plurality of power supplies 21 and 22 may serve as power supplies outputting the same voltage power, for example, like a main battery and a sub battery, or may serve as power supplies outputting different power supply voltages from each other, for example, like 12 [A] and 48 [A].

The header creation portion 12 creates a pulse timing signal SG2 expressing a timing of the power packet in accordance with an instruction of a power transmission instruction signal SG1 outputted by an upper control portion 20, and creates digital information of a header to be added to the power packet. The pulse timing signal SG2 created by the header creation portion 12 is fed to the power transmission pulse creation portion 11 and the filter control portion 14. The digital information is fed to the power supply line 16. The pulse timing signal SG2 is a binary signal expressing a timing of a payload included in the power packet.

The power transmission pulse creation portion 11 creates the pulsed power-supply power in sync with the timing of the pulse timing signal SG2. The filter control portion 14 creates a filter control signal SG3 in accordance with the pulse timing signal SG2. The inverter 15 inverts the filter control signal SG3 to thereby create a filter control signal SG4. Incidentally, when the pulse timing signal SG2 is directly used as the filter control signal SG3, the filter control portion 14 can be dispensed with.

The power transmission filter 13 is a filter circuit used for reducing the harmonic components of the pulsed power-supply power created by the power transmission pulse creation portion 11. When, for example, a fundamental frequency of the pulse outputted from the power transmission pulse creation portion 11 is regarded as fo [kHz], time constants of the capacitor C1 and the coil L1 are determined so that any frequency component not higher than fo [kHz] is substantially not attenuated and any frequency component not lower than 2 fo [kHz] is sufficiently attenuated.

The switch portions SW1 and SW2 are semiconductor switching elements that are opened/closed in accordance with the filter control signals SG3 and SG4 respectively. When the switch portion SW1 is closed, terminals of the coil L1 are short-circuited. When the switch portion SW1 is opened, the coil L1 is connected to the circuit. In addition, when the switch portion SW2 is closed, the capacitor C1 is connected to the circuit. When the switch portion SW2 is opened, the capacitor C1 is cut off from the circuit.

As will be described later, in practice, at a timing at which the payload of each of the power packets appears, the switch portion SW1 is opened and the switch portion SW2 is closed so that the function of the power transmission filter 13 is turned ON. At any other timing, the switch portion SW1 is closed and the switch portion SW2 is opened so that the function of the power transmission filter 13 is turned OFF.

In the example shown in FIG. 1, the router 30 is connected to output terminals 10a and 10b of the mixer 10 through the wire harness WH. The wire harness WH includes an inductance component L2 and a capacitance component C2 as an equivalent electrical circuit, as shown in FIG. 2.

A time constant of a time constant circuit constituted by the inductance component L2 and the capacitance component C2 is sufficiently smaller than that of the power transmission filter 13. Accordingly, the wire harness WH can directly transmit not only the pulsed power-supply power but also a comparatively high frequency signal.

The router 30 shown in FIG. 2 is provided with a diode 41, a power storage portion 42, a header extraction portion 43, and an output control portion 44. Incidentally, the power storage portion 32 may be connected to the outside of the router 30, as shown in FIG. 1.

The diode 41 prevents backflow of the current. The power storage portion 42 that is, for example, constituted by a large capacity capacitor extracts power from each of the power packets transmitted by the wire harness WH, and temporarily stores the power.

The header extraction portion 43 extracts digital information included in a header from the power packet transmitted by the wire harness WH, and gives the digital information to the output control portion 44. The output control portion 44 can extract the power stored in the power storage portion 42 if necessary, and feed the extracted power to each of the loads 33 and 34 shown in FIG. 1 or create a new power packet to transmit power to the other router 31.

When, for example, information about a consumption destination of the power is included in the digital information of the header acquired from the header extraction portion 43 by the output control portion 44, the output control portion 44 can select one from the loads 33 and 34 and the router 31 in accordance with the destination. In addition, when, for example, transmission power information expressing a kind (12, 48 [A], etc.) of a power supply voltage is included, the output control portion 44 can selectively feed the power to a load requiring the power supply voltage or select a suitable power distribution path to the destination.

<Outline of Control>

Figure 3:
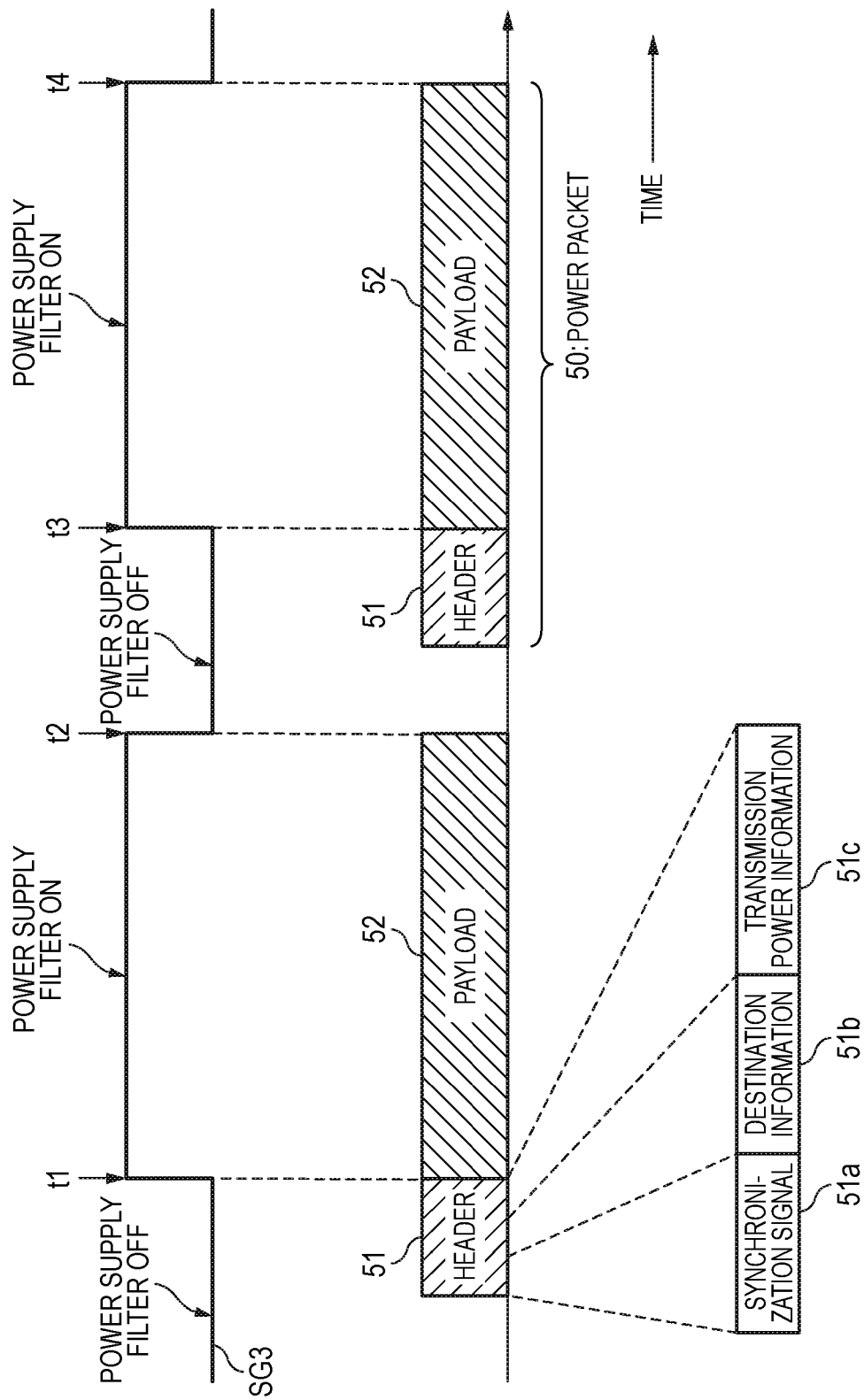
FIG. 3 is a time chart showing an example of a relation between power pockets to be delivered and a filter control signal.

FIG. 3 is a time chart showing an example of a relation between power packets to be delivered and a filter control signal.

In the example shown in FIG. 3, each of the power packets 50 to be delivered to the wire harness WH by the mixer 10 is constituted by a header 51 and a payload 52.

The payload 52 expresses a region where power-supply power to be fed to a downstream side is stored. The header 51 is disposed in the head of the power packet 50 and expresses a region where digital information necessary for management of the packet is stored. The payload 52 is disposed at the rear of the header 51. Incidentally, for example, a footer region may be added to the rear of the payload 52.

The power transmission pulse creation portion 11 shown in FIG. 1 delivers the pulsed power-supply power to the power supply line 16 at a timing within the payload 52 of each of the power packets 50. In addition, the header creation portion 12 delivers the necessary digital information to the power supply line 16 at a timing of the header 51 of the power packet 50.

In the example of FIG. 3, a synchronization signal 51a, destination information 51b, and transmission power information 51c are included in the header 51. The synchronization signal 51a is used so that, for example, the downstream side router 30 can accurately grasp the timing of the head of the power packet 50. For example, the destination information 51b is an identifier based on which a load to consume the power transmitted by the power packet 50, a power distribution path, etc. can be identified. The transmission power information 51c is used, for example, for transmitting information indicating a kind (12, 48 [V] etc.) of the power-supply power transmitted by the power packet 50.

The filter control portion 14 shown in FIG. 1 outputs a filter control signal SG3 synchronized with each of the power packets 50 to be delivered by the router 30. As shown in FIG. 3, the filter control signal SG3 changes from a low level to a high level at a time instant t1, t3, and changes from the high level to the low level at a time instant t2 and t4. The payload 52 of the power packet 50 starts at the time instant t1, t3. The payload 52 ends at the time instant t2, t4.

When the filter control signal SG3 is at the high level, the switch portion SW1 within the power transmission filter 13 is opened and the switch portion SW2 within the power transmission filter 13 is closed. Accordingly, in a section where the payload 52 appears, the function of the power transmission filter 13 is valid (turned ON). Thus, the pulsed power transmission system substantially does not affect the transmission power but can reduce only the harmonic components included in the pulsed power-supply power waveform to thereby reduce radiation noise from the wire harness WH.

In addition, when the filter control signal SG3 is at the low level, the switch portion SW1 within the power transmission filter 13 is closed and the switch portion SW2 within the power transmission filter 13 is opened. Accordingly, in any other section than the section where the payload 52 appears, the function of the power transmission filter 13 is invalid (turned OFF). Since the function of the power transmission filter 13 is made invalid, a transmission waveform of the digital information appearing at the timing of the header 51 etc. is not affected by the power transmission filter 13. Accordingly, the pulsed power transmission system can suppress generation of a transmission error even without reducing a bit rate when the digital information is transmitted. In addition, the current substantially does not flow when the digital information is transmitted. Accordingly, even when the signal including the harmonic components is transmitted, large radiation noise from the wire harness WH is not generated.

Specific Example of Characteristics

<Characteristic Relevant to Transmission Power>

Figure 4:
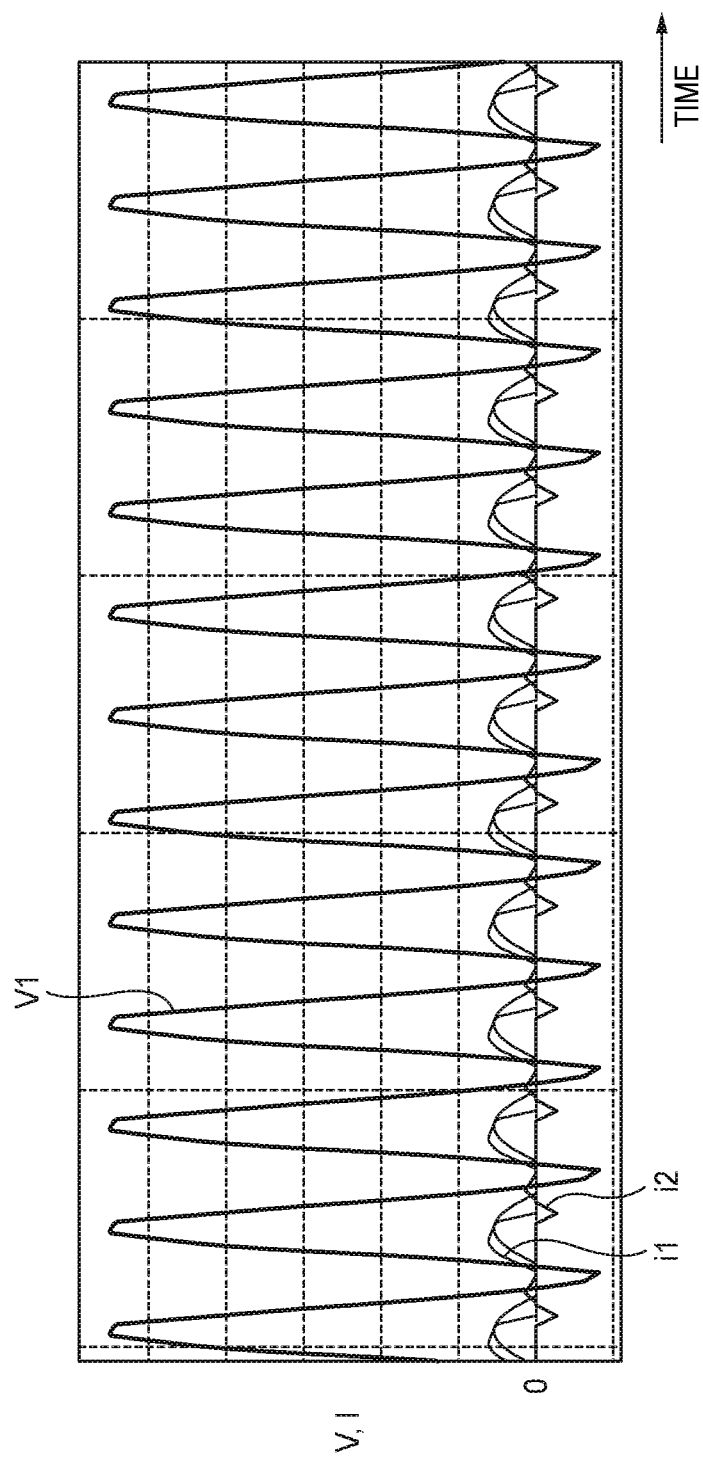
FIG. 4 is a time chart showing an example of voltage and current waveforms when power is transmitted in a pulsed waveform in an embodiment of the present invention.

FIG. 4 is a time chart showing an example of voltage and current waveforms when power is transmitted in a pulsed waveform. In FIG. 4, the abscissa expresses time, and the ordinate expresses voltage or current.

A waveform of a voltage V1 shown in FIG. 4 expresses a change of a voltage of a power packet 50 based on an input of the router 30 at a timing at which the router 30 receives a region of a payload 52 of the power packet 50 from the wire harness WH. In addition, a waveform of each of currents i1 and i2 shown in FIG. 4 expresses a change of a current value of each portion flowing in accordance with the waveform of the voltage V1.

In addition, the example of FIG. 4 shows a result of a simulation that was performed on the assumption that a fundamental frequency of a pulsed power-supply power waveform was fo [kHz], and an inductance component L2 and a capacitance component C2 in a wire harness WH with a predetermined length were 1 [pH] and 50 [pF] respectively. In addition, the time constant of the power transmission filter 13 is determined so that the power transmission filter 13 can have suitable filter characteristics for the pulsed power-supply power waveform.

Figure 5:
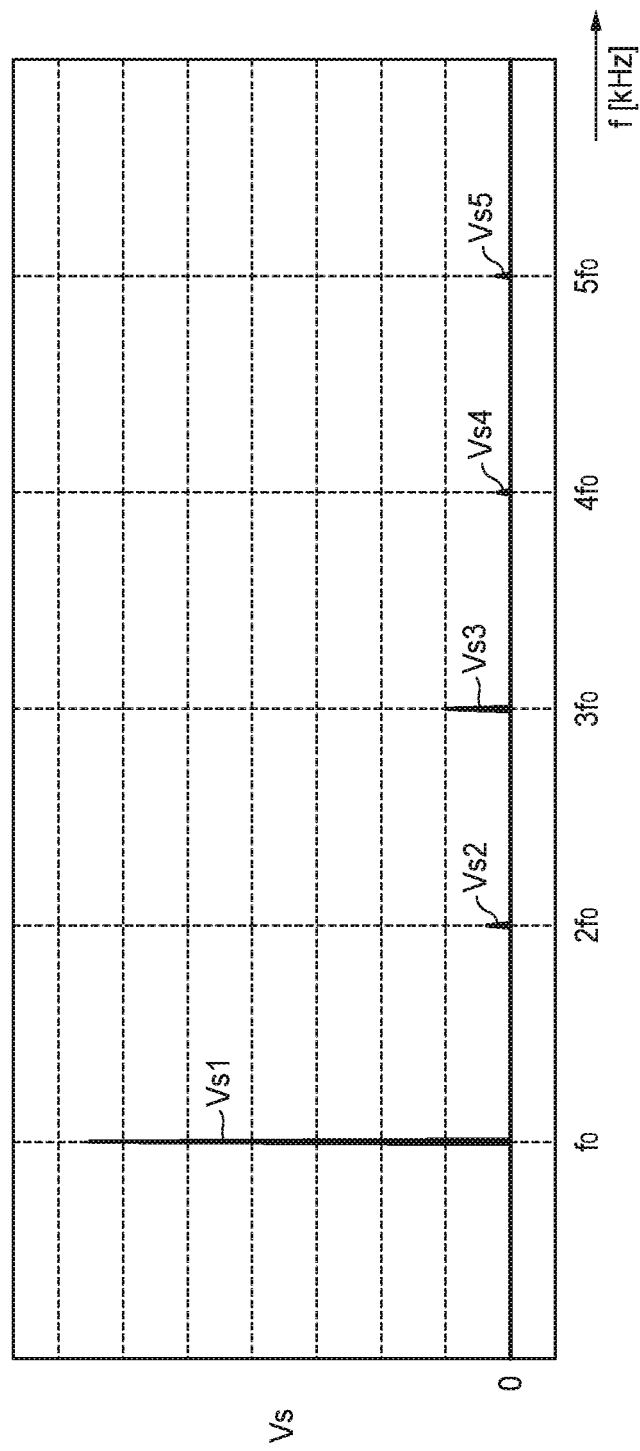
FIG. 5 is a graph showing a distribution example of frequency components included in a voltage waveform when the power is transmitted in the pulsed waveform in the embodiment of the present invention.
Figure 6:
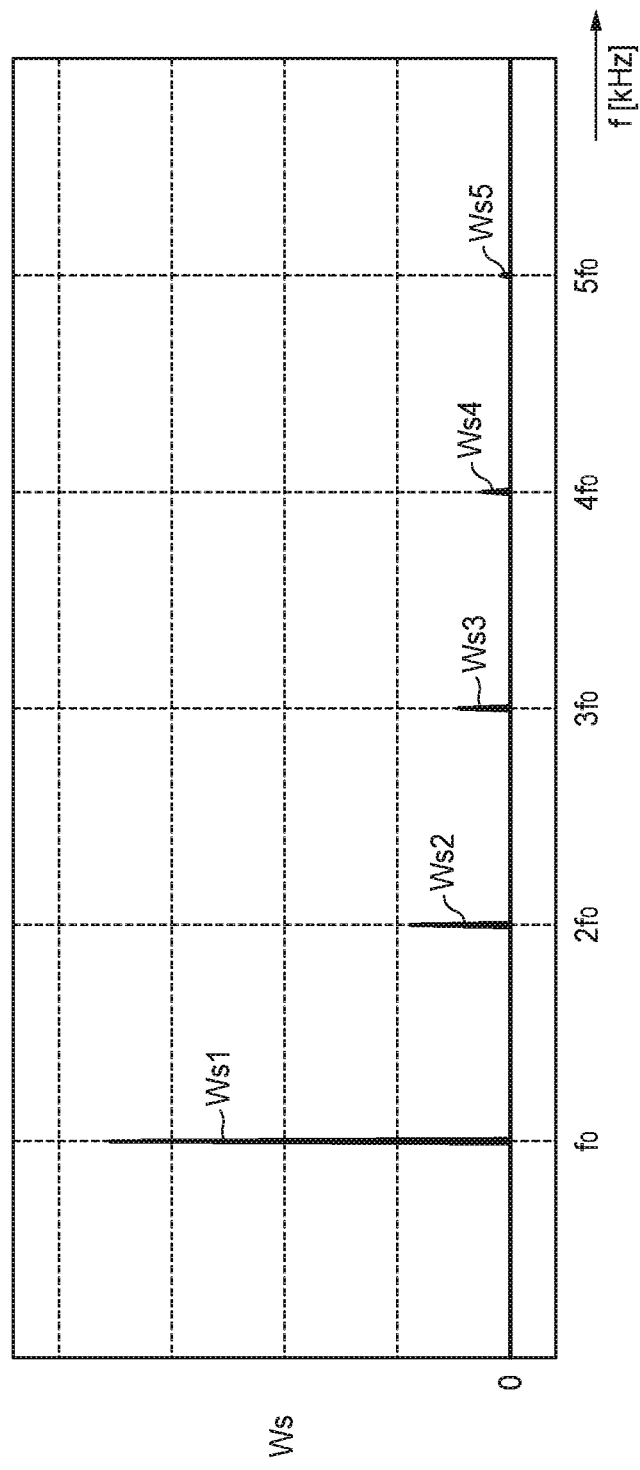
FIG. 6 is a graph showing a distribution example of frequency components included in a power waveform when the power is transmitted in the pulsed waveform in the embodiment of the present invention.

On the other hand, distribution examples of frequency components included in voltage and power waveforms when the power is transmitted in the pulsed waveform are shown in FIG. 5 and FIG. 6, respectively. That is, a result obtained by applying Fourier analysis (FFT) to the waveform of the voltage V1 in the same conditions as those in FIG. 4 is shown in FIG. 5. A result obtained by applying Fourier analysis to the power waveform determined by the voltage V1 and the current i1 is shown in FIG. 6. The abscissa in each of FIG. 5 and FIG. 6 expresses frequency f [kHz], the ordinate of FIG. 5 expresses voltage Vs [V], and the ordinate of FIG. 6 expresses power Ws [W].

Voltages Vs1, Vs2, Vs3, Vs4 and Vs5 shown in FIG. 5 respectively express a fundamental frequency component, a second harmonic component, a third harmonic component, a fourth harmonic component, and a fifth harmonic component with respect to the waveform of the voltage V1. In addition, powers Ws1, Ws2, Ws3, Ws4 and Ws5 shown in FIG. 6 respectively express a fundamental frequency component, a second harmonic component, a third harmonic component, a fourth harmonic component, and a fifth harmonic component with respect to the power waveform.

In the example shown in FIG. 4, the waveform of the voltage V1 is a waveform close to a sine wave, which has a comparatively gentle change. However, the voltage waveform of the power-supply power delivered to the power supply line 16 by the power transmission pulse creation portion 11 shown in FIG. 1 has a rectangular wave generated due to switching in the power transmission pulse creation portion 11. That is, of frequency components included in the rectangular wave outputted by the power transmission pulse creation portion 11, harmonic components high in frequency are reduced by the function of the power transmission filter 13. As a result, the waveform of the voltage V1 shown in FIG. 4 is obtained.

Thus, as for each of the voltage in FIG. 5 and the power in FIG. 6, a ratio of the harmonic components (Vs2 to Vs5, Ws2 to Ws5) is also smaller than that of the fundamental component (Vs1, Ws1). Accordingly, when the mixer 10 shown in FIG. 1 uses the power transmission filter 13, radiation noise generated from the wire harness WH due to the power packet 50 can be restricted within the tolerance at the harmonic frequency region.

<Characteristic Relevant to Digital Information>

Figure 7:
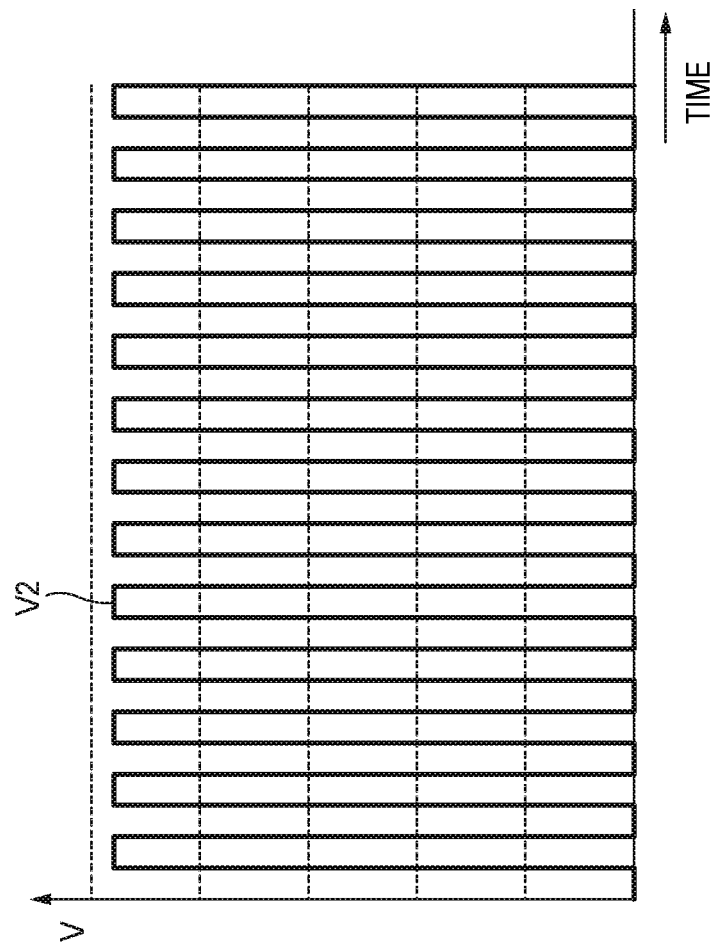
FIG. 7 is a time chart showing an example of a voltage waveform when digital information is transmitted in the embodiment of the present invention.

FIG. 7 is a time chart showing an example of a voltage waveform when digital information is transmitted in the embodiment of the present invention. In FIG. 7, the abscissa expresses time, and the ordinate expresses voltage or current.

A waveform of a voltage V2 shown in FIG. 7 expresses a change example of a voltage of a power packet 50 based on an input of the router 30 at a timing at which the router 30 receives a region of a header 51 of the power packet 50 from the wire harness WH.

In addition, a case where a fundamental frequency of a pulsed waveform used when the digital information within the header 51 is transmitted is fo [kHz] is assumed in the example of FIG. 7. In addition, conditions about the length, the inductance component L2, the capacitance component C2, etc. of the wire harness WH are the same as those in the example of FIG. 4.

Figure 8:
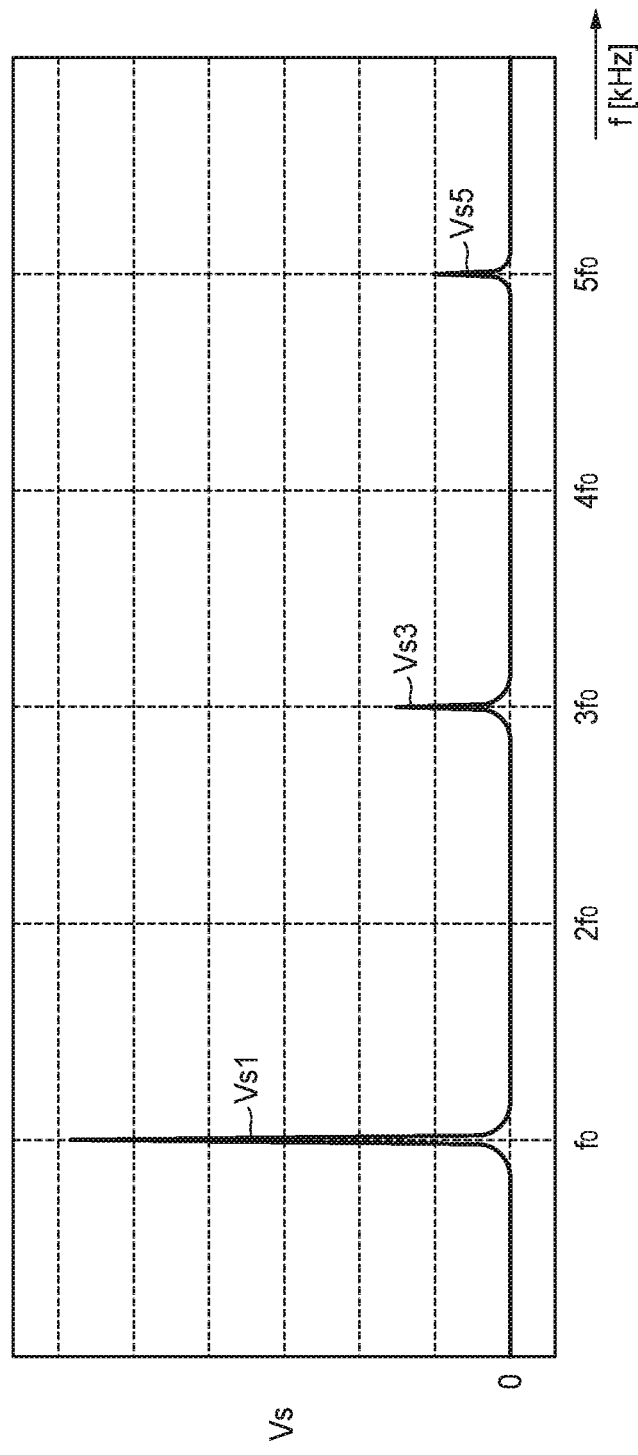
FIG. 8 is a graph showing a distribution example of frequency components included in a voltage waveform when the digital information is transmitted in the embodiment of the present invention.
Figure 9:
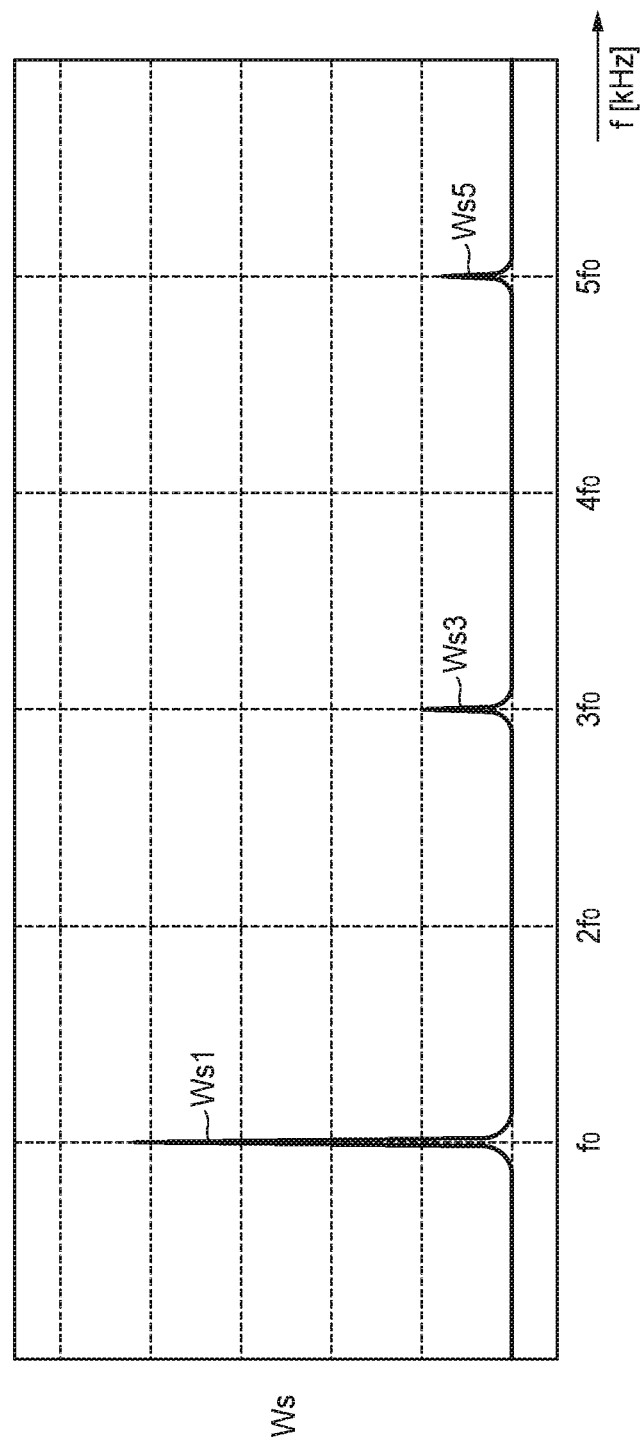
FIG. 9 is a graph showing a distribution example of frequency components included in a power waveform when the digital information is transmitted in the embodiment of the present invention.

On the other hand, distribution examples of frequency components included in the voltage V2 and power waveforms of the digital information shown in FIG. 7 are shown in FIG. 8 and FIG. 9 respectively. That is, a result obtained by applying Fourier analysis to the waveform of the voltage V2 in the same conditions as those in FIG. 7 is shown in FIG. 8, and a result obtained by applying Fourier analysis to the waveform of the power determined by the voltage V2 and an actually flowing current is shown in FIG. 9. The abscissa of each of FIG. 8 and FIG. 9 expresses frequency f [kHz], the ordinate of FIG. 8 expresses voltage Vs [V], and the ordinate of FIG. 9 expresses power Ws [W].

Voltages Vs1, Vs3 and Vs5 shown in FIG. 8 respectively express a fundamental frequency component, a third harmonic component and a fifth harmonic component with respect to the waveform of the voltage V2. In addition, power Ws1, Ws3 and Ws5 shown in FIG. 9 respectively express a fundamental frequency component, a third harmonic component and a fifth harmonic component with respect to the waveform of the power.

In the example shown in FIG. 7, the waveform of the voltage V2 has a rectangular wave having a level change rising and falling suddenly. Accordingly, it is easy to identify a high level/low level. A delay time until the change is detected by a reception side after the signal waveform changes over between the high level and the low level also substantially does not occur. For this reason, even when the digital information is transmitted at a high bit rate, the digital information can be transmitted between the mixer 10 and the router 30 without generating any transmission error.

That is, at a timing other than the section where the payload 52 of the power packet 50 appears, as shown in FIG. 3, the function of the power transmission filter 13 is turned OFF according to the filter control signal SG3. Accordingly, the information of the header 51 delivered to the power supply line 16 by the header creation portion 12 passes through the power transmission filter 13 and arrives at the router 30 via the wire harness WH while maintaining the waveform of the rectangular wave as it is.

For example, a voltage ratio "Vs3/Vs1" shown in FIG. 8 is larger than a voltage ratio "Vs3/Vs1" shown in FIG. 5. That is, the voltage of the third harmonic component Vs3 shown in FIG. 8 is not affected by the power transmission filter 13. Accordingly, the ratio of the voltage of the third harmonic component Vs3 shown in FIG. 8 is larger than the ratio of the voltage of the third harmonic component Vs3 shown in FIG. 5.

In addition, a power ratio "Ws3/Ws1" shown in FIG. 9 is also larger than a power ratio "Ws3/Ws1" shown in FIG. 6. However, the current substantially does not flow when the digital information is transmitted. Accordingly, output power of each of the harmonic components is very small. That is, even in a case where the power ratio "Ws3/Ws1" when the digital information is transmitted is large, a level of radiation noise generated by the wire harness WH is very small.

Incidentally, the case where the digital information is included in the power packet 50 is assumed in the example of FIG. 3. However, the same control can be also applied to a case where, for example, the router 30 transmits the digital information to the mixer 10 via the wire harness WH at a timing at which the router 30 does not transmit the power packet 50. That is, the function of the power transmission filter 13 in the mixer 10 is turned OFF at the timing at which the payload 52 of the power packet 50 does not appear. Thus, the power transmission filter 13 can be prevented from affecting the transmission waveform of the digital information.

<Advantage of Pulsed Power Transmission System>

In the pulsed power transmission system shown in FIG. 1, power is transmitted to the router 30 side through the wire harness WH by use of power packets 50 created by the mixer 10. Accordingly, it is easy to manage the power-supply power. That is, it is possible to change over loads of power consumption destinations or power transmission paths from one to another packet by packet. In addition, there is a concern about an increase of radiation noise from the wire harness WH in a high frequency region due to the use of such power packets. However, since the function of the power transmission filter 13 is used, it is possible to reduce the harmonic components with respect to the pulsed power-supply power waveform to thereby suppress the radiation noise. Further, the function of the power transmission filter 13 is turned OFF at any other timing than the timing of the payload 52 of each of the power packets 50. Accordingly, it is possible to prevent the transmission waveform of the digital information from being deformed so that it is possible to transmit the digital information at a high bit rate.

Here, the aforementioned characteristics of the pulsed power transmission apparatus according to the embodiment of the present invention are briefly summarized and listed in the following configurations [1] to [4] respectively.

[1] A pulsed power transmission apparatus (a mixer 10) including:

a power delivery portion (a power transmission pulse creation portion 11) that delivers pulsed power-supply power to a predetermined transmission line;

a filter circuit (a power transmission filter 13) that reduces a harmonic component of a power-supply power waveform delivered to the transmission line by the power delivery portion;

a switch circuit (switch portions SW1 and SW2) that changes over a function of the filter circuit between ON and OFF; and a switch control portion (a filter control portion 14) that controls the switch circuit; wherein:

the switch control portion turns ON the function of the filter circuit when the pulsed power-supply power is delivered to the transmission line by the power delivery portion, and turns OFF the function of the filter circuit when the pulsed power-supply power is not delivered to the transmission line by the power delivery portion (see FIG. 3).

[2] A pulsed power transmission apparatus according to the aforementioned configuration [1], wherein:

the power delivery portion (a header creation portion 12) adds digital information (a header 51) relevant to the power-supply power to at least one of a front and a rear of the pulsed power-supply power waveform to thereby create a power packet (50); and the switch control portion makes control to turn OFF the function of the filter circuit at a timing of delivering the digital information added to the power packet (see FIG. 3).

[3] A pulsed power transmission apparatus according to the aforementioned configuration [1] or [2], wherein:

the transmission line is a wire harness (WH) mounted on a vehicle.

[4] A pulsed power transmission apparatus according to the aforementioned configuration [2], wherein:

the digital information includes information indicating at least one of a kind of the power packet (transmission power information 51c) and a power consumption destination (destination information 51b).

What is claimed is:

1. A pulsed power transmission apparatus including:
   a power delivery portion that delivers pulsed power-supply power to a predetermined transmission line;
   a filter circuit that reduces a harmonic component of a power-supply power waveform delivered to the transmission line by the power delivery portion;
   a switch circuit that changes over a function of the filter circuit between ON and OFF; and
   a switch control portion that controls the switch circuit; wherein:

the switch control portion turns ON the function of the filter circuit when the pulsed power-supply power is delivered to the transmission line by the power delivery portion, and turns OFF the function of the filter circuit when the pulsed power-supply power is not delivered to the transmission line by the power delivery portion;

wherein;

the power delivery portion adds digital information relevant to the power-supply power to at least one of a front and a rear of the pulsed power-supply power waveform to thereby create a power packet; and wherein the switch control portion makes control to turn OFF the function of the filter circuit at a timing of delivering the digital information added to the power packet.

2. A pulsed power transmission apparatus according to claim 1, wherein:

the digital information includes information indicating at least one of a kind of the power packet and a power consumption destination.

* * * * *